US012774795B2

(12) United States Patent
Hynar et al.

(10) Patent No.: US 12,774,795 B2
(45) Date of Patent: Oct. 27, 2026

(54) HEADLAMP FOR VEHICLE WITH MULTIPLE MAIN FUNCTIONS

(71) Applicant: PO Lighting Czech, s.r.o., Šenov u Nového Jičína (CZ)

(72) Inventors: David Hynar, Šenov u Nového Jičína (CZ); Radek Chmela, Šenov u Nového Jičína (CZ); Ester Guzejova, Šenov u Nového Jičína (CZ)

(73) Assignee: PO Lighting Czech, s.r.o., Šenov u Nového Jičína (CZ)

( * ) Notice: Subject to any disclaimer, the term of this patent is extended or adjusted under 35 U.S.C. 154(b) by 0 days.

(21) Appl. No.: 19/208,728

(22) Filed: May 15, 2025

(65) Prior Publication Data

US 2025/0354672 A1 Nov. 20, 2025

(30) Foreign Application Priority Data

May 17, 2024 (EP) .................................... 24176804

(51) Int. Cl.

| | |
|---|---|
| ***F21S 41/36*** | (2018.01) |
| ***F21S 41/143*** | (2018.01) |
| ***F21S 41/148*** | (2018.01) |
| ***F21S 41/32*** | (2018.01) |
| ***F21S 41/37*** | (2018.01) |
| ***F21S 41/40*** | (2018.01) |
| *F21Y 115/10* | (2016.01) |

(52) U.S. Cl.
CPC .......... *F21S 41/321* (2018.01); *F21S 41/143* (2018.01); *F21S 41/148* (2018.01); *F21S 41/36* (2018.01); *F21S 41/37* (2018.01); *F21S 41/40* (2018.01); *F21Y 2115/10* (2016.08)

(58) Field of Classification Search
CPC .......... F21S 41/321; F21S 41/36; F21S 41/37; F21S 41/143; F21S 41/148; F21S 41/40; F21Y 2115/10
See application file for complete search history.

(56) References Cited

U.S. PATENT DOCUMENTS 4,915,479 A * 4/1990 Clarke .............. G02F 1/133524 349/64
9,435,503 B2 * 9/2016 Masuda ................ F21S 41/365
(Continued)

FOREIGN PATENT DOCUMENTS

CN 205880482 U 1/2017
DE 102012203929 B3 9/2013
(Continued)

OTHER PUBLICATIONS

Search English translation of WO 2009010465 A1 (Year: 2009).*
(Continued)

*Primary Examiner* — Omar Rojas Cadima
(74) *Attorney, Agent, or Firm* — Dilworth IP, LLC

(57) ABSTRACT

A headlamp with a streamlined design that has one aperture for multiple functions, using a device that combines the outputs from individual light sources into a single visible output aperture. The device includes at least one mirror surface facing the light source and reflecting the output beam towards the visible output aperture, which can be achieved through the use of prisms or mirrors that are carefully positioned and angled to direct the individual beams towards the aperture.

18 Claims, 6 Drawing Sheets

(56) References Cited

U.S. PATENT DOCUMENTS

| | | | | |
|---|---|---|---|---|
| 10,865,956 | B1 | 12/2020 | Shih | |
| 2005/0002110 | A1* | 1/2005 | Imade .................. | G03B 21/208 359/640 |
| 2007/0019429 | A1* | 1/2007 | Gasquet ................ | F21S 43/315 362/510 |
| 2011/0216549 | A1* | 9/2011 | Futami ................. | B60Q 1/0041 362/520 |
| 2013/0242585 | A1 | 9/2013 | Brendle | |
| 2019/0353323 | A1* | 11/2019 | Furubayashi ......... | F21S 43/245 |
| 2020/0072433 | A1 | 3/2020 | Scoville | |

FOREIGN PATENT DOCUMENTS

| | | | | |
|---|---|---|---|---|
| DE | 102014205994 | A1 * | 10/2015 | ............ F21S 41/151 |
| DE | 102019118051 | A1 | 1/2021 | |
| EP | 3081852 | A1 | 10/2016 | |
| EP | 4027052 | A1 | 7/2022 | |
| FR | 3062708 | A1 | 8/2018 | |
| FR | 3130011 | A1 | 6/2023 | |
| FR | 3124574 | B1 | 9/2023 | |
| WO | WO-2009010465 | A1 * | 1/2009 | ............ F21S 43/249 |
| WO | 2022/125030 | A1 | 6/2022 | |

OTHER PUBLICATIONS

Englsih translation of DE 102014205994 A1 (Year: 2015).*

European Search Report received for EP Application No. 24176804, mailed on Oct. 16, 2024, 3 pages.

Office Action in EP Patent Application No. 24176804.3 dated Sep. 22, 2026.

* cited by examiner

HEADLAMP FOR VEHICLE WITH MULTIPLE MAIN FUNCTIONS

TECHNICAL FIELD

The invention relates to vehicle headlamps for vehicles, particularly headlamps with multiple main functions.

BACKGROUND

Multiple light sources emitting individual output beams is an essential aspect of the present disclosure, which addresses a problem in existing headlamp designs that need as many apertures as functions, resulting in constrained inaesthetic design. Aggregating more and more functions implies providing more and more apertures. This goes against current designers' trend to make the technical functions disappear behind a refined, non-technical facelift.

The same problem increases with high-resolution projection systems based on HD lighting technologies enabled by micro-LED or digital mirror devices. In this case, an HD system has such a different outlook that combining it with existing headlamps in a modular package is not a viable option for a skilled person. Even in a combined package, providing multiple apertures would mean less freedom in the aesthetic design of the car face.

SUMMARY OF THE INVENTION

The invention provides a solution that makes it possible to create a more streamlined design of a headlamp, even when combining multiple functions in it.

The present disclosure relates to an innovative lighting design that utilizes multiple light modules, but not as many output apertures.

A light module preferably comprises a light source, primary optics and a lens.

According to the invention, a lighting system is provided in which each of at least two light modules produces its own output beam from light emitted by its own light source. An optical device redirects the output beam of at least one light module and combines it with the output beam the other light module into a single composite output beam in which the lights emitted by the at least two light sources are in partial overlap.

Hence, the single composite output beam can use one single output aperture to exit the lighting system of the invention.

The lighting system allows for the possibility of combining multiple individual light modules, such as projector modules, which can enhance the overall performance and versatility of the headlamp. The visible output aperture of the lighting system is configured to ensure optimal light distribution for illuminating the desired area in front of the vehicle.

The optical device comprises at least one reflective surface facing a light module and reflecting its output beam as a component of the composite output beam, allowing for combining multiple individual light modules (e.g. projector modules) without any need for multiple output apertures.

The invention addresses the challenge of how to combine multiple individual light sources providing multiple light functions, such as a high beam and a low beam, into a single headlamp avoiding the use of multiple output apertures. Also, the invention helps save space, which is another general challenge when designing car components.

By using an optical device that combines the outputs from individual light sources into a single composite output beam, the invention allows for headlamps with multiple functions and only one aperture.

According to the invention, the light reflection can be achieved through the use of an optical device that is carefully positioned and angled to direct each individual beam towards the single composite output beam.

The materials used for the optical device are chosen for their high reflectivity and transparency, such as glass, plastic material or silicon, possibly with highly polished surface or layer.

In a first embodiment, the optical device comprises at least one prism having at least one reflective surface which reflects a light module output beam off the reflective surface of the prism and directs it as a component of the composite output beam. In a preferred embodiment, a V-shape reflective surface of the same prism allows reflection of two output beams facing each other combined into the single composite output beam. Then, one integral prism with a V-shape reflective surface can reflect two beams. Preferably, a refractive total interface reflection device is used, the reflective surface of which may be metallized for a better efficiency, for instance with a thin aluminium layer.

Another embodiment differs from the first one in that the optical device comprises at least a mirror instead of a prism to combine the individual output beams into a single composite output beam. The optical device thus comprises at least one mirror which reflects a light module output beam and directs it as a component of the composite output beam. In this embodiment, each light module can be directed towards a mirror, which reflects the beam as a component of the composite output beam.

The potential advantages of using a prism-based design compared to a mirror-based design for the device include greater stability in adjusting the angle of the composite output beam. Although prisms can be more complex to manufacture, they appear to be more stable in their position than mirrors. However, mirrors can also be properly held in place by appropriate means.

The lighting system of the invention is capable of adjusting the angle of the composite output beam by manipulating its position or orientation in the headlamp housing.

Thanks to the invention, brightness and colour balance of each beam can be individually controlled in each light module, as in prior art headlamps.

The lighting system can also accommodate different types of light modules by selecting appropriate optical devices, whether prisms or mirrors, that are compatible with the specific type of light source being used.

The distance between the individual light modules and the optical device will impact the composite output beam in terms of its brightness and distribution. For instance, it is possible that a larger distance will result in a weaker composite beam, while a smaller distance will produce a stronger, more focused beam. The device maintains alignment of the individual light modules and optical device thanks to a holder. Adjustable mounts or mechanical systems ensure proper positioning and orientation of each module in relation to the optical device. The holder is also adjustable in vertical and horizontal orientation by tilting means controllable from outside the headlamp. This can be adjusted through mechanical or electrical means, allowing for fine-tuning of the composite output beam.

According to the invention, the light rays emitted by the light sources of each light module are in partial overlap. This means that some of the light rays of each light module overlap. The overlapping can take place either within the optical device or immediately after leaving the optical device, at a distance from the optical device that is very small compared to the dimensions of the lighting system. For example, overlapping shall not occur more than 10 mm away from the optical device, and preferably not more than 75 mm. However, this maximal distance is obviously proportional to the dimensions of the lighting system. For a very large lighting system with a very large output aperture, the maximal distance is obviously greater than for a very small lighting system with a very small output aperture. In any case, the light rays overlap so close to the optical device that it would not be possible for the composite beam to exit the optical device through several different apertures without degrading the performance of the illumination provided by the composite beam.

The lighting system can be used in combination with other types of headlamp features by integrating it into a larger system that includes additional lighting elements, such as daytime running lights, turn signals, or other types of auxiliary lamps.

In a particular embodiment, the output aperture of the lighting system is delimited by at least one hiding screen that hides the light modules from an observer looking at the headlamp from outside the vehicle. Depending on the design of the headlamp, the observer may notice the presence of the lighting system inside the headlamp housing but cannot see the light modules inside the lighting system because they are hidden by the screens.

In a particular embodiment, the hiding screen also is an auxiliary light module that provides auxiliary signalling functions, such as a turn signal.

Another object of the invention is a vehicle headlamp comprising a lighting system as described above.

BRIEF DESCRIPTION OF DRAWINGS

For a better understanding of the invention, embodiments will now be described, with the following illustrating figures.

DETAILED DESCRIPTION

Figure 1:
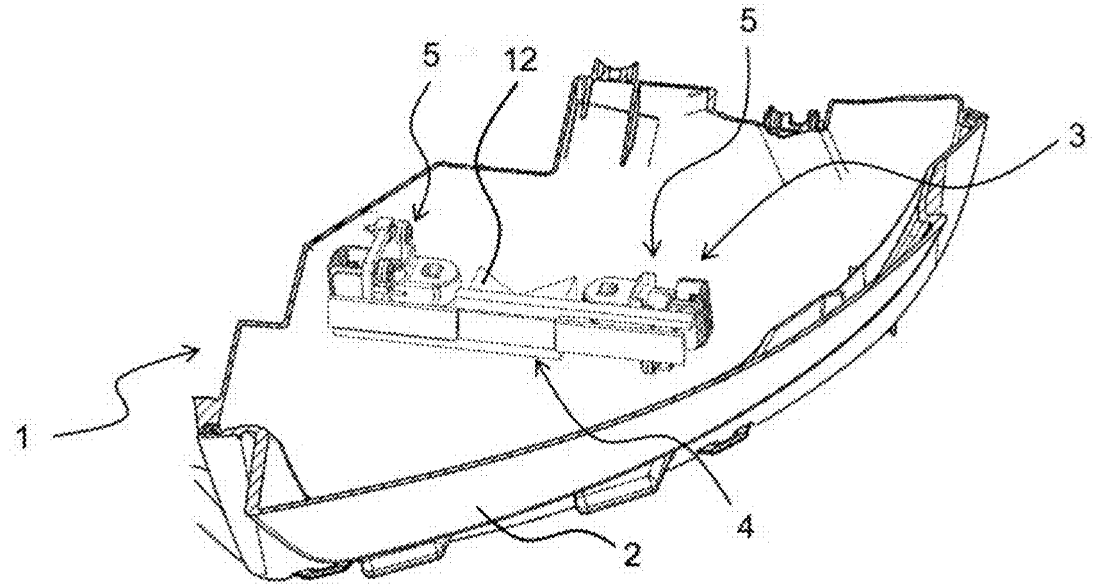
FIG. 1 shows a perspective view from above of a headlamp including a lighting system according to a first embodiment.
Figure 2:
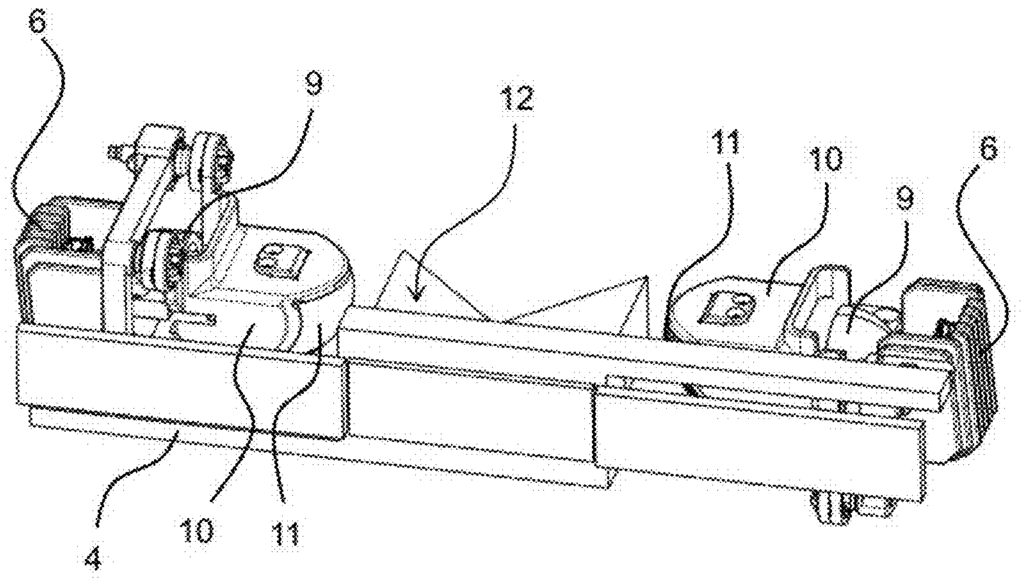
FIG. 2 is a perspective view of the lighting system of FIG. 1, seen from the front of the vehicle.

In the first embodiment of FIGS. 1 and 2, a headlamp comprises a housing 1 with a front transparent face 2. Inside housing 1, various components can be accommodated. They are not described in this description for not being related to the invention.

A lighting system 3 according to a first embodiment of the invention is included in housing 1 and comprises:

- a holder 4,
- a pair of light modules 5, each comprising a heatsink 6, a printed circuit board (PCB) 7, a light emitting diode (LED) 8, a primary optics 9, a lens holder 10 and a secondary lens 11.

These components are usual for a light module. Each light module is thus able to produce an output beam of light, from light emitted by its own LED 8.

The two light modules 5 are facing each other, fixed on holder 4 with their secondary lenses 11 in opposition. They have been preassembled in this position on holder 4 before lighting system 3 was introduced and mounted into headlamp housing 1.

Lighting system 3 also comprises a prism 12 positioned between facing lenses 11 of light modules 5. Prism 12 is the optical device in this first embodiment.

Prism 12 has a mirrored surface 13 forming a reflecting face able to combine the individual output beams from two light modules 5 into a single composite output beam.

Mirrored surface 13 is V-shaped. It can be symmetrical or asymmetrical, depending on the expected composite output beam resulting from the combination of light modules 5 and their set positions on holder 4.

Figure 3:
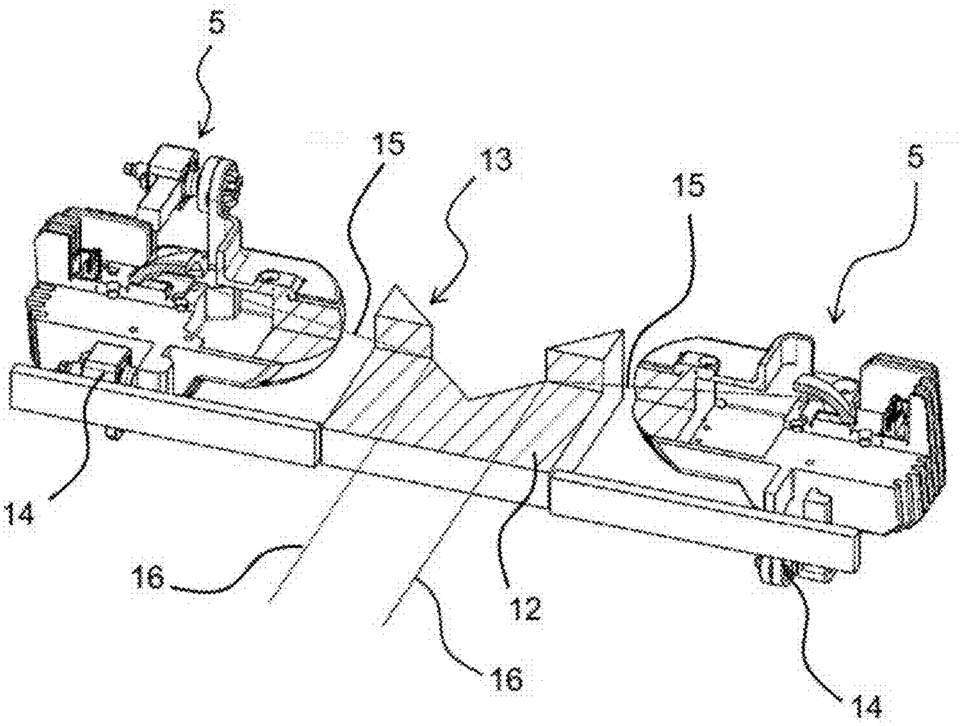
FIG. 3 is a view similar to FIG. 2 with a partial cross-sectioning along line A-A of FIG. 7, of the optical device.
Figure 4:
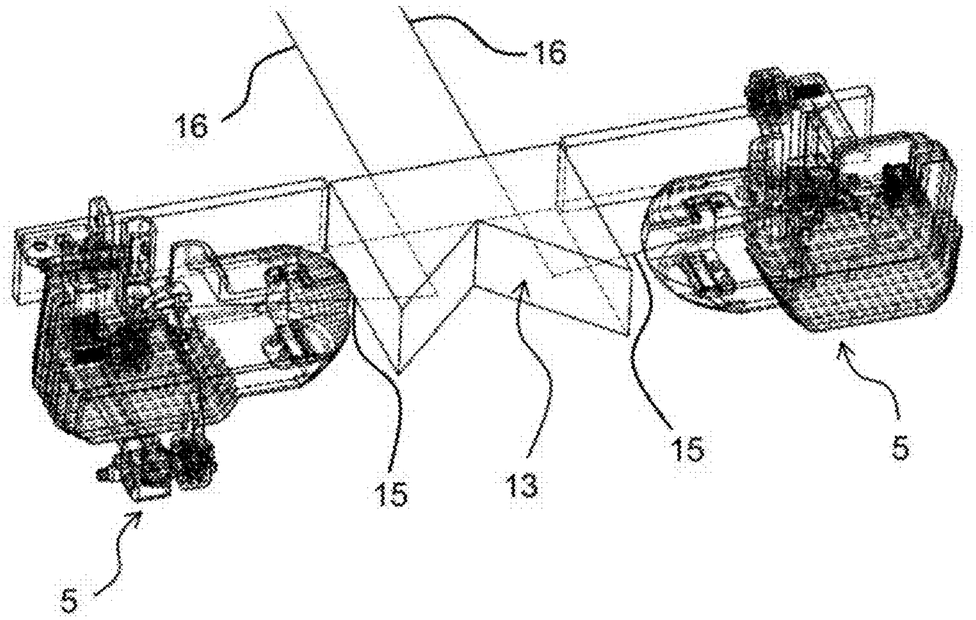
FIG. 4 is perspective view of the lighting system of FIG. 1, seen from inside the vehicle.
Figure 5:
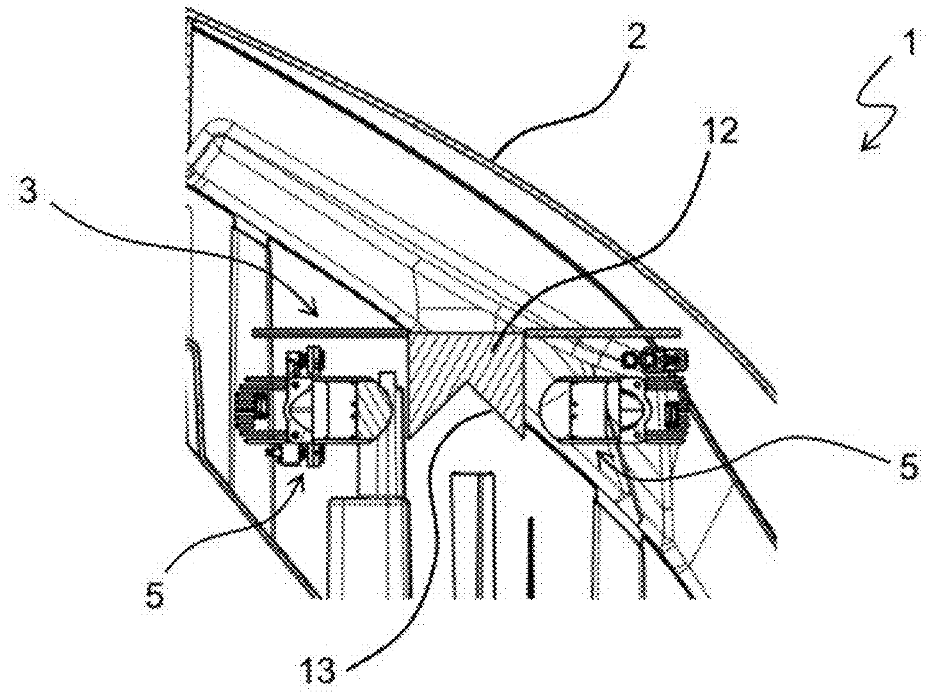
FIG. 5 is a top view of the lighting system mounted in the headlamp housing.
Figure 6:
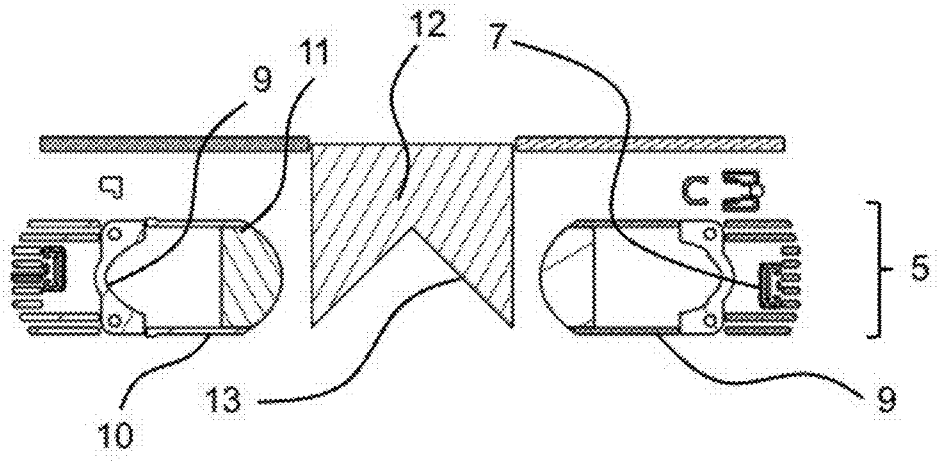
FIG. 6 is a top view of the optical device of FIG. 5, alone.
Figure 7:
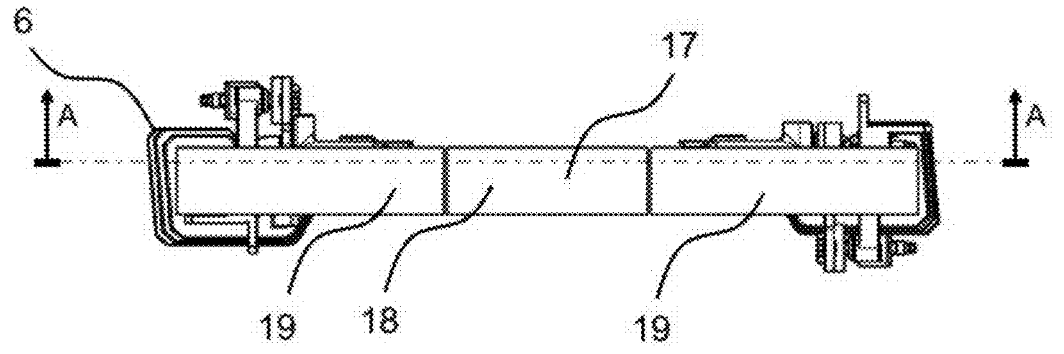
FIG. 7 is a front view of the optical device of FIG. 5, alone.

In FIG. 3, the reflection of one light ray 15 emitted by each light emitting diode 8 on reflective face 13 of prism 12 is illustrated.

Each light ray 15 is reflected off mirrored surface 13 of prism 12 and directed towards the front of the vehicle. Mirrored surface 13 ensures that each individual beam is accurately reflected and directed towards the desired location, resulting in a focused and optimized light distribution.

To ensure optimal performance of prism 12, materials are chosen that are highly reflective and transparent. This may include highly polished or finely moulded metal or glass or plastics material or silicon, as well as coatings or treatments that enhance reflectivity or transparency. Prism 12 is preferably as clear and transparent as possible. However, depending on the expected illumination functions, a translucent material may also work for the optical device.

Adjustable mounts 14 maintain proper alignment of individual light modules 5 relative to optical device 12 on holder 4, which is valuable for achieving a focused and balanced output beam.

The distance between individual light modules 5 and prism 12 will impact the brightness and distribution of the combined output beam. As such, it may be useful to adjust the position or orientation of prism 12 or the mounts for light modules 5 in order to achieve the desired performance. This can be done through mechanical adjustments or by using control systems that regulate the output of each source based on environmental conditions or user preferences.

Figure 8:
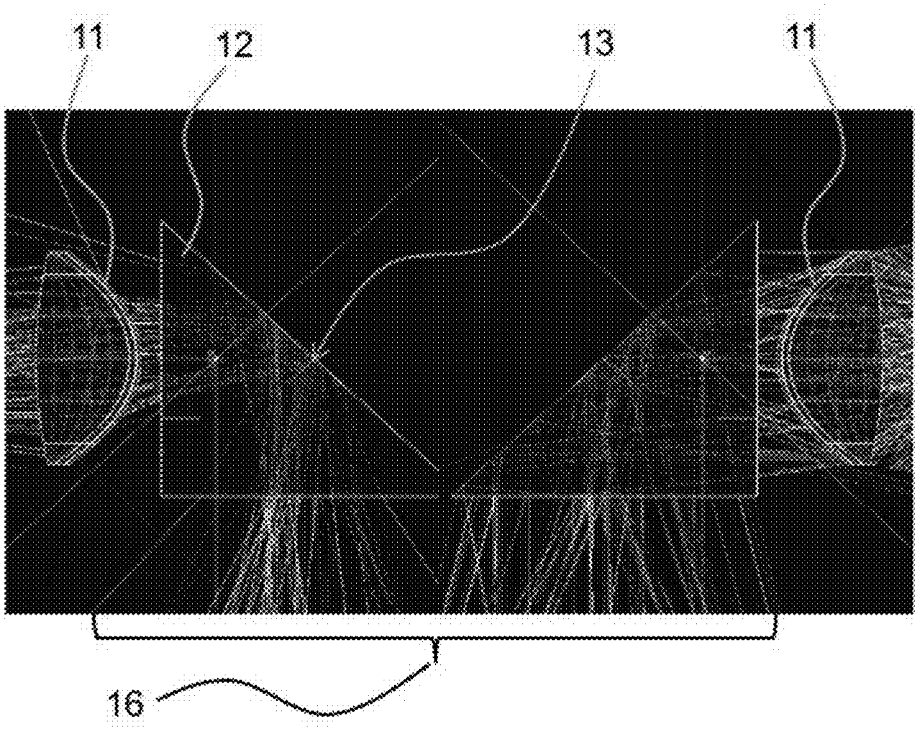
FIG. 8 is a simulation output showing rays going through the lighting system of this first embodiment.

The beam resulting from the combination by optical device 12 of light rays 15 emitted by light emitted diodes 8 is a composite output beam 16, a simulation of which is illustrated in FIG. 8.

On can see in FIG. 8 that the light rays of both light sources 8 are combined into the composite output beam 16 in which light rays overlap partially. This overlapping defines the composite output beams produced by combining the two light modules 5 in the lighting system.

Output composite beam 16 should be treated as one single beam. Thus, it exits the lighting system through one single output aperture 17. Because of the partial overlapping of light rays emitted by the two light sources 8, it would not be possible for the output composite beam 16 to exit the lighting system thought two distinct apertures.

In this first embodiment, output aperture 17 lies a front face 18 of optical device 12, roughly perpendicular to the composite beam's direction. Output aperture 17 is delimited by two side screens 19 that are located between an observer (not shown) standing in front of the vehicle and light modules 5, when the lighting system is mounted in headlamp housing 1 and headlamp is mounted on the vehicle. Screens 19 act as hiding screens preventing the observer from seeing the light modules. Screens 19 are also mounted on holder 4, with all the components of the lighting system.

In an alternative embodiment (not shown), screens 19 have an external face equipped with means for producing a signalling function, in addition to their hiding function.

Figure 9:
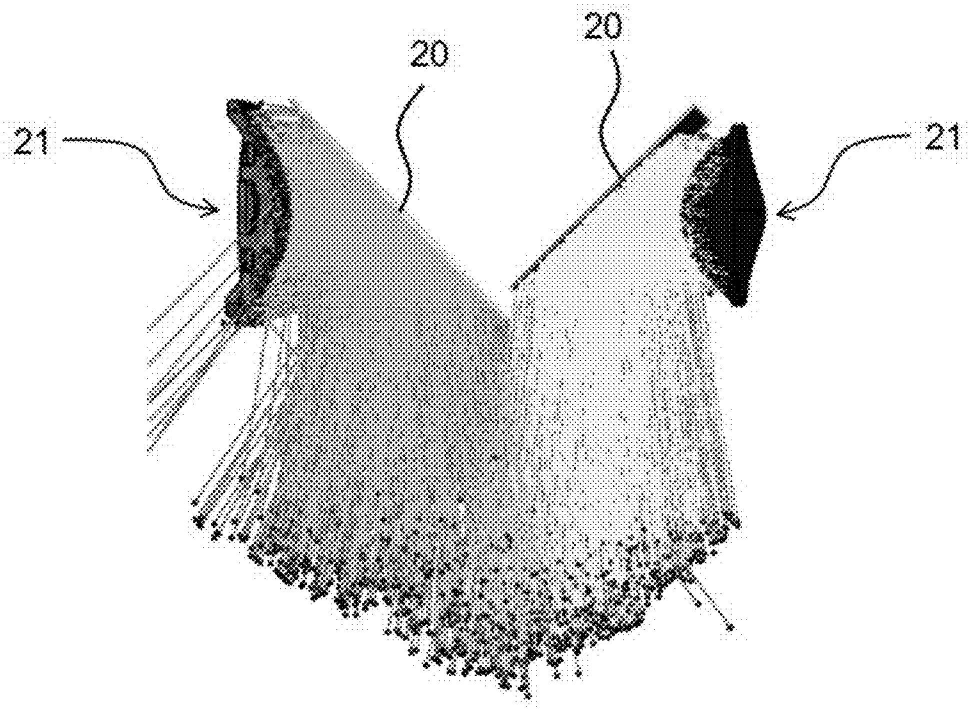
FIG. 9 is a simulation output showing rays going through a lighting system according to a second embodiment.

In the second embodiment of FIG. 9, instead of a prism, the optical device comprises two mirrors 20 to combine the light rays from two light modules 21 into a single composite output beam. Each light source is directed towards a separate mirror 20. The light modules have the same position as in the previous embodiment.

Figure 10:
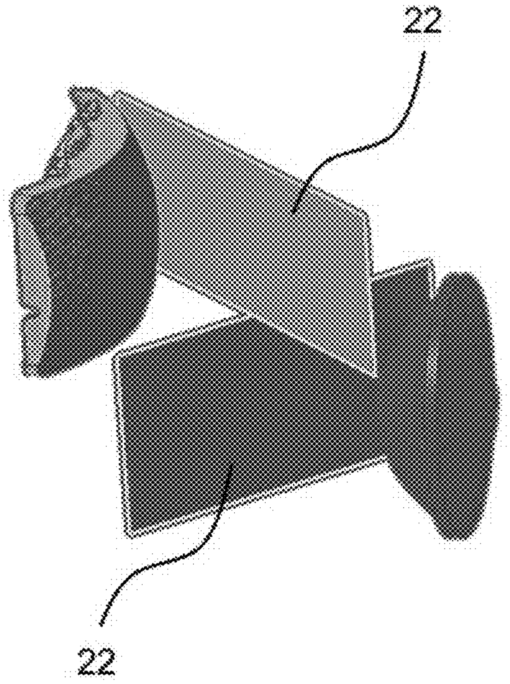
FIG. 10 is a perspective view of lenses of projector modules and an optical device of a lighting system according to a third embodiment.

In the third embodiment of FIG. 10, the light modules are placed above each other and oriented in opposition. Two mirrors 22 are also placed above each other and oriented symmetrically. The role of mirrors 22 is to reflect the individual beams and combine them into one single composite output beam, as illustrated by the simulation, where one can see that light rays coming from the two light sources overlap partially. By carefully positioning and angling the mirrors, the device can be adjusted to change the angle of the combined output beam, allowing for greater flexibility in terms of light distribution. A (not shown) holder manages the positioning of the mirrors and light modules.

Figure 11:
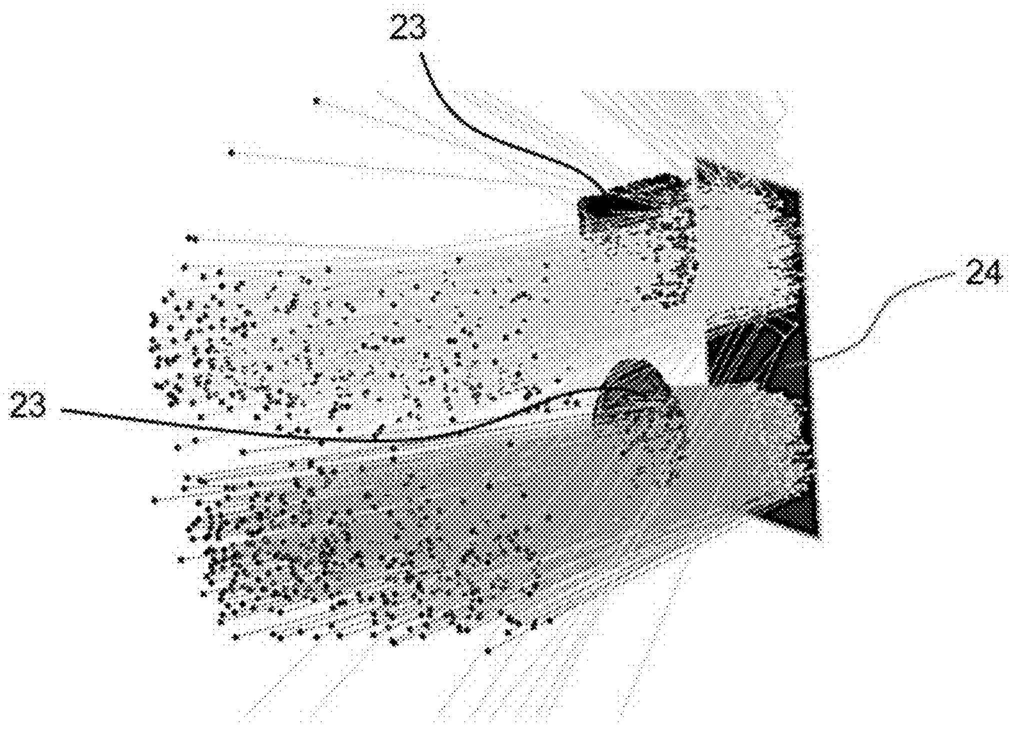
FIG. 11 is a simulation output showing rays going through a lighting system according to a fourth embodiment.

In the fourth embodiment of FIG. 11, light modules 23 are above each other and the optical device is made of only one mirror 24.

The use of mirrors may allow for greater flexibility in adjusting the angle of the combined output beam.

The materials used for the mirror surfaces may be highly reflective and durable enough to withstand environmental conditions such as heat, moisture, and other types of damage. Specialized coatings or materials may also be used to enhance reflectivity or resistance to environmental factors.

Figure 12:
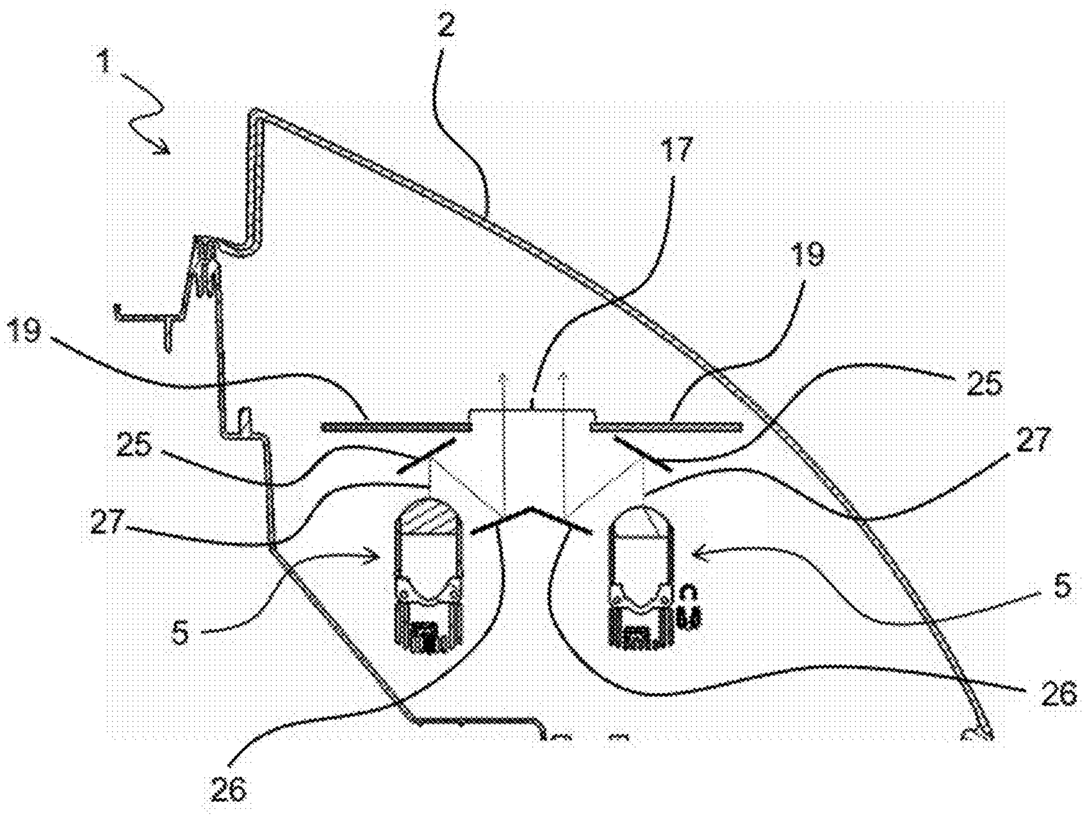
FIG. 12 is a top view similar to FIG. 5 of a lighting system according to a fifth embodiment, mounted in a headlamp housing.

In the fifth embodiment of FIG. 12, the light modules 5 are the same as in the embodiment of FIGS. 1-7, but they are positioned differently on the holder (not shown). The output aperture 17 is still defined by the space left open between the two hiding screens 19. Light modules 5 are parallel to each other, each one facing a hiding screen 19. Their optical axis is perpendicular to said screens. Two mirrors 25, 26 per light module 5 are used to direct the rays from the secondary lens 11 towards the output aperture 17 of the system. First mirror 25 reflects rays 27 emitted by secondary lens 11 toward second mirror 26. Second mirror 26 reflect rays 27 received from first mirror 25 toward output aperture 17. In this example, mirrors 25 and 26 are arranged so that rays 27 exiting output aperture 17 are parallel to the optical axis of light modules 5. One can understand that positioning mirrors 25 and 26 relatively to one another allows to arrange light modules 5 in housing 1 in many different positions (i.e. not only parallel to one another) according to the available room in housing 1. This flexibility offers more possibilities when designing a compact housing 1 without having to redesign a prism specifically.

Indeed, the use of mirrors as in the second to fifth embodiments, in place of a prism with mirrored faces, also offers some advantages in terms of manufacturing and cost. Mirrors can be more easily fabricated and may require fewer adjustments to achieve optimal performance than a prism, which can be more complex to manufacture. Additionally, as exemplified in FIG. 12, the use of mirrors may allow for greater flexibility in adjusting the angle of the combined output beam.

In the above-described embodiments, two light module output beams are reflected by the optical device before being merged into one single composite output beam. In another embodiment, not shown, only one light device output beam could be reflected by the optical device. After reflection, the reflected light module output beam would merge with another non-reflected light module output beam into the composite output beam.

LIST OF REFERENCES

1: housing
2: front transparent face
3: lighting system
4: holder
5: light module
6: heatsink
7: printed circuit board (PCB)
8: light emitting diode (LED)
9: primary optics
10: lens holder
11: secondary lens
12: prism
13: mirrored surface
14: adjustable mounts
15: light ray
16: composite output beam
17: output aperture
18: front face of optical device
19: hiding screen
20: mirrors
21: light module
22: mirrors
23: light module
24: mirror
25: mirrors
26: mirrors

The invention claimed is:

1. A vehicle lighting system, comprising:

at least two light modules, each light module including a light source, primary optics and a lens and producing an output beam from light emitted by the respective light source, wherein the at least two light modules are facing each other, fixed on a holder, with the lenses in opposition to each other; and an optical device that redirects the output beam of each of the at least two light modules exiting the lenses and combines the output beams into a single composite output beam such that, after having been redirected by the optical device, the output beams are in partial overlap, wherein each of the at least two light modules is positioned on a separate adjustable mount.

2. The vehicle lighting system according to claim 1, comprising one single output aperture for the single composite output beam to exit the vehicle lighting system.

3. The vehicle lighting system according to claim 1, wherein the optical device comprises at least one reflective surface facing one light module of the at least two light modules and reflecting the output beam of the one light module as a component of the single composite output beam.

4. The vehicle lighting system according to claim 1, wherein materials used for the optical device are chosen in a list consisting of glass, plastic material, and silicon.

5. The vehicle lighting system according to claim 1, wherein materials used for the optical device are chosen in a list consisting of glass, plastic material, and silicon, with a polished surface or layer.

6. The vehicle lighting system according to claim 1, wherein the optical device comprises at least one prism having at least one reflective surface which reflects a light module output beam off the at least one reflective surface of the at least one prism and directs it as a component of the single composite output beam.

7. The vehicle lighting system according to claim 6, wherein a V-shape reflective surface of the at least one prism allows reflection of two output beams facing each other.

8. The vehicle lighting system according to claim 1, wherein the optical device comprises at least one mirror which reflects the output beam of the at least two light modules and directs the output beam as a component of the single composite output beam.

9. The vehicle lighting system according to claim 8, wherein the at least two light modules are placed above each other and oriented in opposition, the optical device comprising two mirrors placed above each other and oriented symmetrically to combine light rays from two light modules into the single composite output beam.

10. The vehicle lighting system according to claim 8, wherein the at least two light modules are above each other and the optical device is made of only one mirror.

11. The vehicle lighting system according to claim 8, wherein the optical device comprises at least a first and a second mirror for one of the at least two light modules, the first mirror reflecting rays emitted by the one of the at least two light modules toward the second mirror, the second mirror reflecting rays received from first mirror toward an output aperture.

12. The vehicle lighting system according to claim 1, wherein an output aperture of the vehicle lighting system is delimited by at least one hiding screen that hides the at least two light modules from an observer looking at a headlamp comprising the vehicle lighting system from outside the vehicle.

13. The vehicle lighting system according to claim 12, wherein the at least one hiding screen also is an auxiliary light module that provides auxiliary signalling functions.

14. A vehicle headlamp comprising the vehicle lighting system according to claim 1.

15. The vehicle lighting system according to claim 1, wherein the optical device comprises a first flat side surface facing a first one of the at least two light modules, a second flat side surface facing a second one of the at least two light modules, first and second mirrored surfaces between the first and second flat side surfaces, and a single output aperture on a front face of the optical device.

16. The vehicle lighting system according to claim 1, wherein each of the at least two light modules, including the respective lenses, are spaced apart from the optical device.

17. A vehicle lighting system, comprising:

at least two light modules, each light module including a light source, primary optics and a lens and producing an output beam from light emitted by the respective light source, wherein the at least two light modules are facing each other, fixed on a holder, with the lenses in opposition to each other; and an optical device that redirects the output beam of each of the at least two light modules exiting the lenses and combines the output beams into a single composite output beam such that, after having been redirected by the optical device, the output beams are in partial overlap, wherein the optical device comprises at least one mirror which reflects the output beam of the at least two light modules and directs the output beam as a component of the single composite output beam, wherein the optical device comprises at least a first and a second mirror for one of the at least two light modules, the first mirror reflecting rays emitted by the one of the at least two light modules toward the second mirror, the second mirror reflecting rays received from first mirror toward an output aperture.

18. A vehicle lighting system, comprising:

at least two light modules, each light module including a light source, primary optics and a lens and producing an output beam from light emitted by the respective light source, wherein the at least two light modules are facing each other, fixed on a holder, with the lenses in opposition to each other; and an optical device that redirects the output beam of each of the at least two light modules exiting the lenses and combines the output beams into a single composite output beam such that, after having been redirected by the optical device, the output beams are in partial overlap, wherein an output aperture of the vehicle lighting system is delimited by at least one hiding screen that hides the at least two light modules from an observer looking at a headlamp comprising the vehicle lighting system from outside the vehicle.

* * * * *